(12) United States Patent
Edelen et al.

(10) Patent No.: US 10,343,519 B2
(45) Date of Patent: Jul. 9, 2019

(54) MECHANICAL SHIFT ASSEMBLY FOR A SHIFTABLE TANDEM DRIVE AXLE

(71) Applicant: Dana Heavy Vehicle Systems Group, LLC, Maumee, OH (US)

(72) Inventors: Stephen A. Edelen, Battle Creek, MI (US); Richard A. Nellums, Portage, MI (US); James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 63 days.

(21) Appl. No.: 15/631,658

(22) Filed: Jun. 23, 2017

(65) Prior Publication Data

US 2017/0368934 A1    Dec. 28, 2017

Related U.S. Application Data

(60) Provisional application No. 62/353,966, filed on Jun. 23, 2016.

(51) Int. Cl.
    *F16H 48/24*    (2006.01)
    *B60K 17/36*    (2006.01)
    (Continued)

(52) U.S. Cl.
    CPC .............. *B60K 17/36* (2013.01); *B60K 17/02* (2013.01); *B60K 17/165* (2013.01);
    (Continued)

(58) Field of Classification Search
    CPC .............. B60K 2023/046; B60K 17/36; B60K 17/3467; B60K 17/3462; B60K 17/346;
    (Continued)

(56) References Cited

U.S. PATENT DOCUMENTS

| 2,158,320 A | 5/1939 | Bock |
| 2,699,075 A | 1/1955 | Buckendale |

(Continued)

FOREIGN PATENT DOCUMENTS

WO    2008019779 A2    2/2008

OTHER PUBLICATIONS

Machine-generated English Translation of WO2008019779, obtained via Espacenet Patent Search.

*Primary Examiner* — Roger L Pang
(74) *Attorney, Agent, or Firm* — Marshall & Melhorn, LLC

(57) ABSTRACT

A tandem drive axle mechanical shift assembly including a first shift rail assembly having a first shift rail actuated via a first pneumatic actuator, and a shift fork having a first end coupled with the first shift rail and a second end coupled with an engagement selector. A second shift rail assembly having a second shift rail actuated via a second pneumatic actuator, and a second shift fork having a first end coupled with the second shift rail and a second end coupled with an inter-axle differential lock-up clutch. First and second primary valves in fluid communication with a reservoir, and a secondary valve in fluid communication with the reservoir and in selective fluid communication with the second pneumatic actuator. A first actuation valve operated by the first shift rail and in selective fluid communication with the first and second primary valves, and the first and second pneumatic actuators.

7 Claims, 8 Drawing Sheets

(51) Int. Cl.
  *F16H 61/30* (2006.01)
  *F16H 48/08* (2006.01)
  *F16H 48/32* (2012.01)
  *B60K 23/04* (2006.01)
  *F16H 37/08* (2006.01)
  *F16D 25/10* (2006.01)
  *F16D 23/02* (2006.01)
  *B60K 17/02* (2006.01)
  *B60K 17/16* (2006.01)
  *B60K 17/346* (2006.01)
  *F16H 63/04* (2006.01)

(52) U.S. Cl.
  CPC ........ *B60K 17/346* (2013.01); *B60K 17/3462* (2013.01); *B60K 17/3467* (2013.01); *B60K 23/04* (2013.01); *F16D 23/02* (2013.01); *F16D 25/10* (2013.01); *F16H 37/0813* (2013.01); *F16H 48/08* (2013.01); *F16H 48/24* (2013.01); *F16H 48/32* (2013.01); *F16H 61/30* (2013.01); *B60K 2023/046* (2013.01); *F16H 63/04* (2013.01)

(58) Field of Classification Search
  CPC ....... B60K 17/165; B60K 23/04; F16H 61/30; F16H 37/0813; F16H 48/24; F16H 48/32; F16H 48/08; F16D 25/10
  USPC .......................... 475/201, 221, 222, 233, 237
  See application file for complete search history.

(56) References Cited

U.S. PATENT DOCUMENTS

| | | | |
|---|---|---|---|
| 3,146,842 A * | 9/1964 | Nelson | B60K 17/3467 180/24.09 |
| 4,050,534 A | 9/1977 | Nelson et al. | |
| 4,194,586 A | 3/1980 | Hicks | |
| 4,432,431 A | 2/1984 | Russell | |
| 5,271,479 A | 12/1993 | Kuwahara et al. | |
| 5,351,780 A | 10/1994 | Kuwahara et al. | |
| 5,560,248 A * | 10/1996 | Devaud | F16H 61/2807 477/138 |
| 6,152,848 A | 11/2000 | Williams et al. | |
| 6,450,915 B1 | 9/2002 | Kazaoka et al. | |
| 6,634,978 B2 | 10/2003 | Banno et al. | |
| 6,851,501 B2 | 2/2005 | Gassmann | |
| 6,974,400 B2 | 12/2005 | Williams | |
| 7,384,366 B2 | 6/2008 | Kelley, Jr. | |
| 7,677,875 B2 | 3/2010 | Yamada | |
| 8,398,520 B1 | 3/2013 | Bassi et al. | |
| 8,651,994 B2 | 2/2014 | Bassi et al. | |
| 2010/0154576 A1* | 6/2010 | Leichsenring | B60K 17/3467 74/473.11 |
| 2010/0248888 A1 | 9/2010 | Hamperl et al. | |
| 2012/0021864 A1 | 1/2012 | Ziech et al. | |
| 2018/0051786 A1* | 2/2018 | Krishnan | B60K 17/3462 |

\* cited by examiner

MECHANICAL SHIFT ASSEMBLY FOR A SHIFTABLE TANDEM DRIVE AXLE

RELATED APPLICATIONS

The present application claims the benefit to U.S. Provisional Application No. 62/353,966 filed on Jun. 23, 2016, which is incorporated herein by reference in its entirety.

BACKGROUND

Vehicles incorporating tandem drive axles benefit in many ways over vehicles having a single driven axle. Inter-axle differentials in such vehicles may be configured to distribute torque proportionately or disproportionately between the axles. Additionally, shift mechanisms may be provided to such vehicles to permit the disengagement of one of the driven axles or to transition from single axle operation to tandem axle operation, among other benefits.

Such shiftable, multi-mode tandem drive axles have complex shift mechanisms that tend to be expensive. Further, such tandem drive axles may suffer from hardware problems relating to sequencing an engagement of the various components. Two technologies commonly used in such shift mechanisms are electronic and pneumatic sequencing. Tight control of shifting events using these technologies increases cost and fault mode concerns of the tandem drive axle. Substantial hardware problems can occur if shifting events of the tandem drive axle are out of sequence. Tandem drive axles require a shift method that ensures the required operating modes are achieved in a reliable manner with a minimum of complexity.

It would be advantageous to develop a mechanically operated shift assembly for a tandem drive axle system that reduces complexity and a cost of such shift mechanisms while ensuring reliable and safe operation.

SUMMARY

The present disclosure provides for a tandem drive axle mechanical shift assembly. In an embodiment, the tandem drive axle mechanical shift assembly includes a first shift rail assembly having a first pneumatic actuator, a first shift rail having a first diameter and a second diameter defining a cam surface, and a shift fork having a first end coupled with the first shift rail and a second end coupled with an engagement selector. The first shift rail is actuated via the first pneumatic actuator. The tandem drive axle mechanical shift assembly also includes a second shift rail assembly having a second pneumatic actuator, a second shift rail actuated via the second pneumatic actuator, and a second shift fork having a first end coupled with the second shift rail and a second end coupled with an inter-axle differential lock-up clutch. The tandem drive axle mechanical shift assembly further includes, first and second primary valves in fluid communication with a fluid reservoir, and a secondary valve in fluid communication with the fluid reservoir and in selective fluid communication with the second pneumatic actuator. A first actuation valve is in selective fluid communication with the first and second primary valves, the first pneumatic actuator, and the second pneumatic actuator. The first actuation valve is operated by the first shift rail cam surface.

In another embodiment, the tandem drive axle mechanical shift assembly includes a shift rail assembly having a first pneumatic actuator with a first piston and a second piston, and a first shift rail having a first diameter and a second diameter defining a cam surface. The first shift rail is coupled with the first piston. A first shift fork has a first end drivingly engaged with the first shift rail and a second end coupled with a first engagement selector. A second shift fork has a first end drivingly engaged with the first shift rail and a second end coupled with a second engagement selector. First and secondary primary valves are in fluid communication with a fluid reservoir. A secondary valve is also in fluid communication with the fluid reservoir and the first pneumatic actuator. Further, an actuation valve operated by the first shift rail cam surface, is in fluid communication the first and second primary valves, and the first pneumatic actuator.

In another embodiment, the tandem drive axle mechanical shift assembly includes a shift rail assembly having a first pneumatic actuator with a first piston and a second piston. A first shift rail having a first diameter and a second diameter defining a cam surface is disposed through and coupled with the first piston. A first shift fork has a first end drivingly engaged with the first shift rail and a second end coupled with an engagement selector. First and second primary valves are in fluid communication with a fluid reservoir. A secondary valve is also in fluid communication with the fluid reservoir and the first pneumatic actuator. An actuation valve is operated by the first shift rail cam surface, and is in fluid communication with the first and second primary valves and the first pneumatic actuator.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure and do not illustrate all possible implementations thereof. The drawings are not intended to limit the scope of the present disclosure in any way.

DETAILED DESCRIPTION OF THE PREFERRED EMBODIMENTS

Figure 1A:
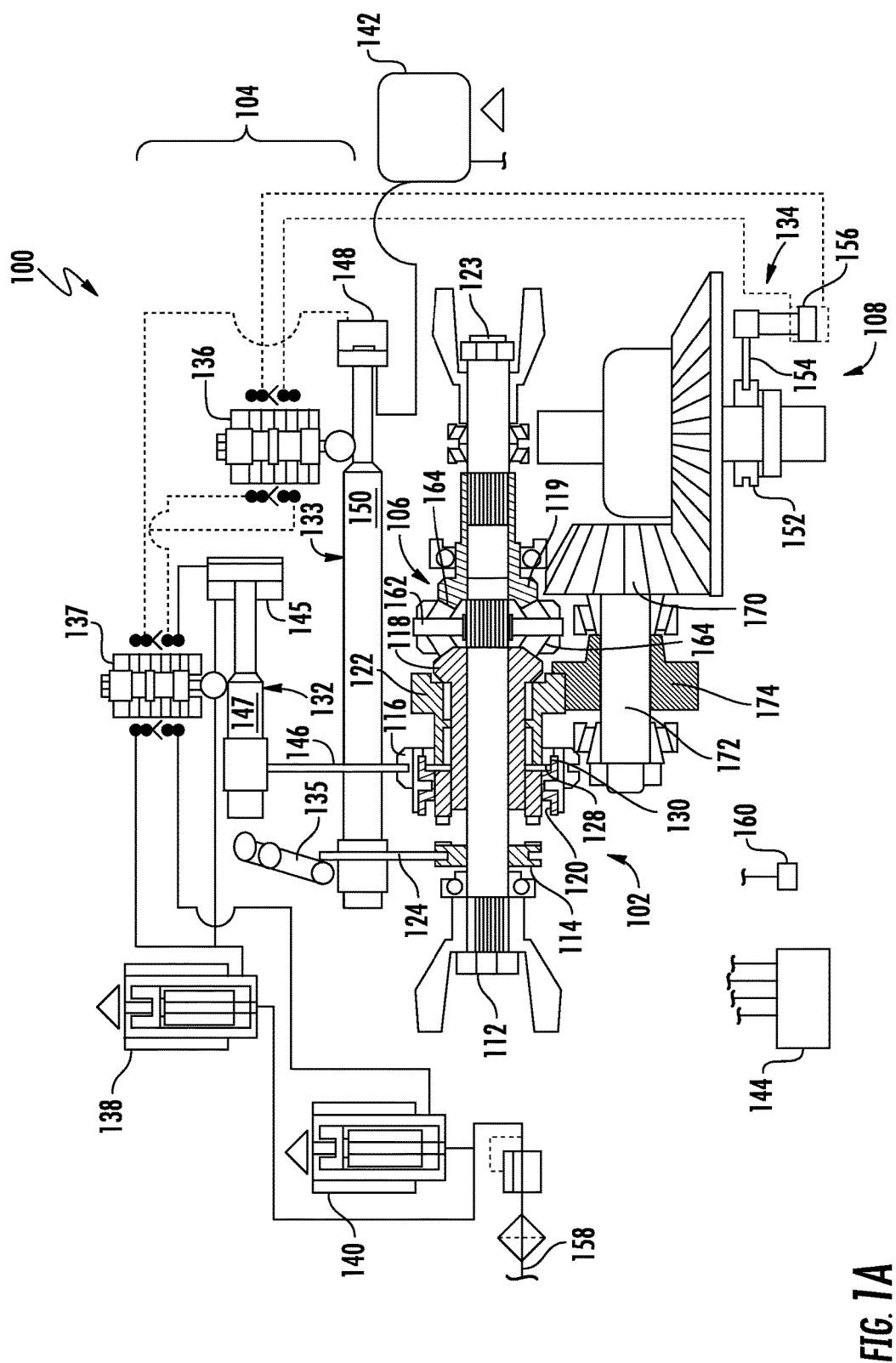
FIG. 1A illustrates a tandem axle system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tandem axle system 100 are described herein. As illustrated in FIG. 1B, in certain embodiments, the tandem axle system 100 is utilized with a vehicle 10. The tandem axle system 100 may have additional applications in commercial, light duty, heavy duty, and off-highway vehicles. The tandem axle system 100 may also have industrial, locomotive, military, agricultural, and aerospace applications.

As illustrated in FIG. 1B, in an embodiment, the vehicle 10 comprises the tandem axle system 100. The tandem axle system 100 comprises a front axle assembly 108 and a rear axle assembly 110.

Figure 1B:
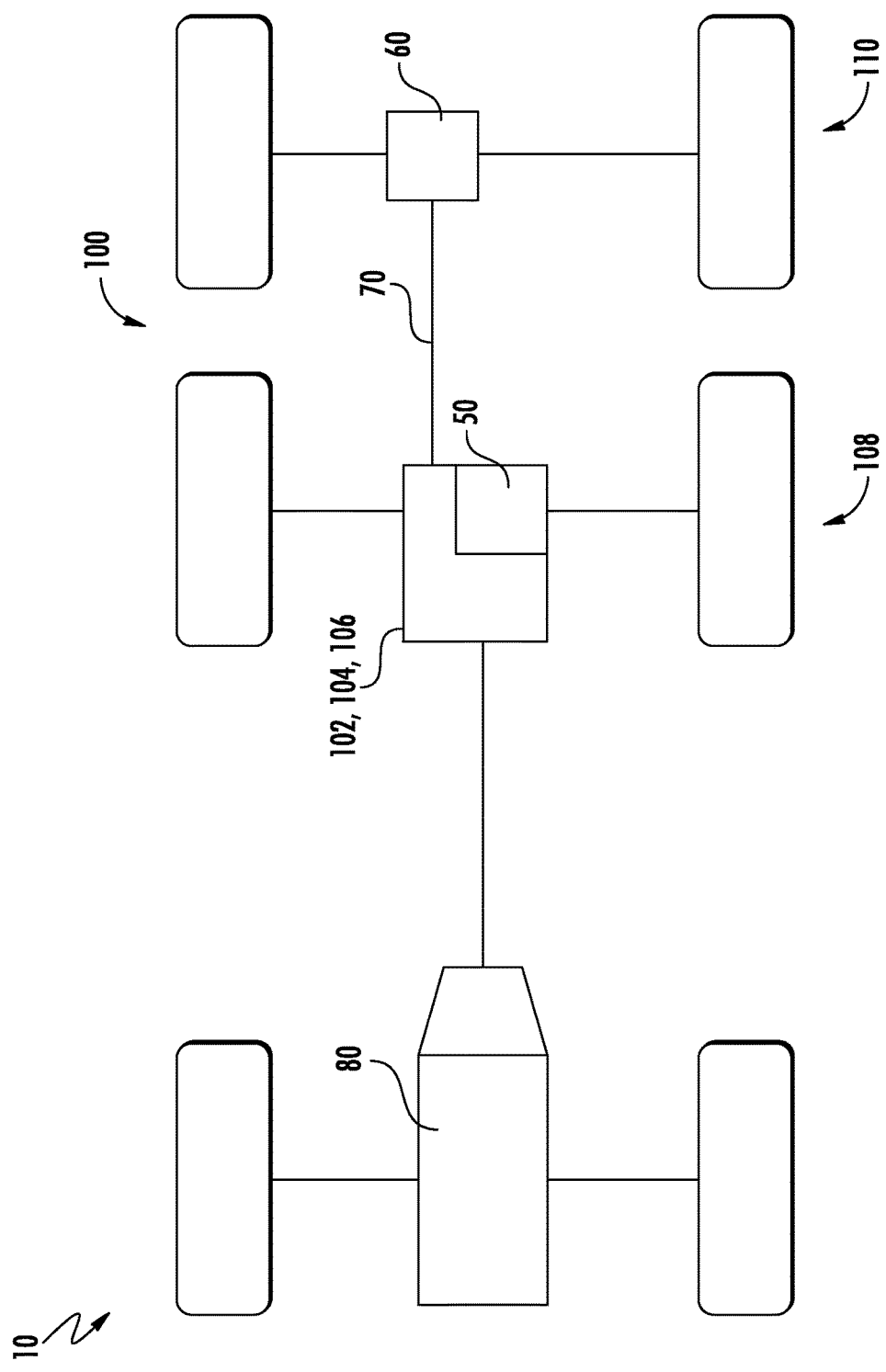
FIG. 1B is a schematic of a tandem axle vehicle according to an embodiment of the presently disclosed subject matter.

In an embodiment, as illustrated in FIG. 1A, the tandem axle system 100 further includes a mechanically operated shift assembly 102 (hereinafter referred to as a "shift assembly"). The tandem axle system 100 also includes an actuation assembly 104, an inter-axle differential 106, the front axle assembly 108, and the rear axle assembly 110 (see FIG. 1B). It is understood that the rear axle assembly 110 utilized with the tandem axle system 100 is similar to a rear axle assembly 310 as illustrated in FIG. 3B. The front axle assembly 108 and the rear axle assembly 110 are in selective driving engagement with the inter-axle differential 106 and the shift assembly 102. The actuation assembly 104 is in driving engagement with a portion of the shift assembly 102 and the front axle assembly 108. In the embodiment illustrated in FIG. 1A, the rear axle assembly is in constant driving engagement with the inter-axle differential 106. The front axle assembly 108 and the rear axle assembly are well known in the art.

The shift assembly 102 is disposed about an input shaft 112 of the tandem axle system 100. The shift assembly 102 includes a lock-up clutch 114, an engagement selector 116, a first side gear 118 of the inter-axle differential 106, a second side gear 119 of the inter-axle differential 106, a synchronizer 120, and an axle output gear 122. The first side gear 118 may be drivingly engaged with the front axle assembly 108 through the synchronizer 120 and the axle output gear 122. The second side gear 119 may be drivingly engaged with the rear axle assembly through an output shaft 123.

The lock-up clutch 114 is disposed about and in splined engagement with the input shaft 112. The lock-up clutch 114 may be engaged with the input shaft 112 via a plurality of splines formed on an inner surface of the lock-up clutch 114 and an outer surface of the input shaft 112, but is not limited thereto. The lock-up clutch 114 comprises a plurality of teeth formed thereon for engaging a portion of the first side gear 118. In an embodiment, the lock-up clutch 114 teeth are formed on a radially outer surface thereof. In another embodiment, as illustrated in FIG. 1A, the lock-up clutch 114 teeth are formed on an axially outer surface thereof. Further, an outer surface of the lock-up clutch 114 is coupled with a shift fork 124 of the actuation assembly 104. In an embodiment, a portion of the shift fork 124 may be disposed in a groove defined by the lock-up clutch 114.

The engagement selector 116 is disposed on and engaged with the synchronizer 120. An inner surface of the engagement selector 116 is geared for engagement with the synchronizer 120 and a portion of the axle output gear 122. The engagement selector 116 may be slidably moved along the outer surface of the synchronizer 120. An outer surface of the engagement selector 116 is coupled with the shift fork 146 of the actuation assembly 104.

The first side gear 118 of the inter-axle differential 106 includes an axially extending portion 126. The first side gear 118 is disposed about and rotatable with respect to the input shaft 112. A plurality of bearings disposed between the input shaft 112 and the first side gear 118 facilitate rotation therebetween. A distal end of the axially extending portion 126 includes a plurality of teeth formed thereon for engaging the synchronizer 120.

The synchronizer 120 is disposed on and engaged with the axially extending portion 126 of the first side gear 118. An inner surface of the engagement synchronizer 120 includes a plurality of teeth formed thereon for engaging the first side gear axially extending portion 126. An outer surface of the engagement synchronizer 120 includes a plurality of teeth formed thereon for engaging the inner surface of the engagement selector 116. The synchronizer 120 may be slidably moved along a portion of the axially extending portion 126. The synchronizer 120 includes a first conical engagement surface 128 for variably engaging a portion of the axle output gear 122 in a manner that facilitates synchronization.

The axle output gear 122 is disposed on and rotatable with respect to the axially extending portion 126 of the first side gear 118. A plurality of bearings disposed between the axle output gear 122 and the first side gear 118 facilitate rotation therebetween. A first distal end of the axle output gear 122 extends in a radial manner and includes a plurality of teeth and a second conical engagement face 130 formed thereon. The first distal end of the axle output gear 122 may be variably engaged with the synchronizer 120 and drivingly engaged with the engagement selector 116 in response to movement of the engagement selector 116. A second distal end of the axle output gear 122 extends in a radial manner and includes a plurality of teeth formed thereon for engaging the front axle assembly 108, however, it is understood that the axle output gear 122 of the tandem axle system 100 including the shift assembly 102 may be configured to engage the rear axle assembly 110.

The actuation assembly 104 comprises a primary shift rail assembly 132, a secondary shift rail assembly 133, an axle disconnect assembly 134, a shift rail toggle 135, a first mechanically operated actuation valve 136, a second mechanically operated actuation valve 137, a pair of primary solenoid valves 138, 140, a secondary solenoid valve 142, and a controller 144. The actuation assembly 104 is in fluid communication with a filtered and pressure regulated fluid supply 158. As a non-limiting example, the filtered and pressure regulated fluid supply 158 may be an air supply. The actuation assembly 104 is in driving engagement with the engagement selector 116 and the lock-up clutch 114 of the shift assembly 102, and a portion of the front axle assembly 108.

The primary shift rail assembly 132 includes an actuator 145, a shift fork 146, and a shift rail 147. The actuator 145 is pressure driven by the solenoid valve 138 and the solenoid valve 140 through the mechanically operated actuation valve 137. The actuator 145 includes a chamber in which a piston is sealingly disposed. The piston is coupled to the shift rail 147 in driving engagement with the shift fork 146. The piston divides the chamber into two zones, each of which is in respective fluid communication with the solenoid valves 138, 140. The shift rail 147 is an elongate member having a portion with an increased diameter which acts as a linear cam to actuate the mechanically operated actuation valve 137.

As shown in FIG. 1A, the shift rail 147 is positioned adjacent the mechanically operated actuation valve 137. In response to movement of the shift rail 147, the increased diameter portion actuates the mechanically operated actuation valve 137. In response to air being delivered to the chamber from the solenoid valve 138, the shift rail 147 is moved in a direction that results in the engagement selector 116 being moved towards the axle output gear 122, as shown in FIG. 1A, until the piston reaches a limit of the chamber. In response to air being delivered to the chamber from the solenoid valve 140 through the mechanically operated actuation valve 137, the shift rail 147 is moved in a direction that results in the engagement selector 116 being moved away from the axle output gear 122, until the piston reaches a limit of the chamber.

The secondary shift rail assembly 133 includes an actuator 148, the shift fork 124, and a shift rail 150. The actuator 148 is pressure driven by the solenoid valve 140 through the mechanically operated actuation valve 137 and the solenoid valve 142. The actuator 148 may also be mechanically driven by the shift rail toggle 135 when the shift rail 147 is moved in a direction that results in the engagement selector 116 being moved away from the axle output gear 122. The actuator 148 includes a chamber into which a piston is sealingly disposed, which is connected to the shift rail 150 in driving engagement with the shift fork 124. The piston divides the chamber into two zones, each of which is in respective fluid communication with the solenoid valves 140, 142. The shift rail 150 is an elongate member having a portion with an increased diameter which acts as a linear cam to actuate the mechanically operated actuation valve 136.

As shown in FIG. 1A, the shift rail 150 is positioned adjacent the mechanically operated actuation valve 136 and the shift rail toggle 135. In response to movement of the shift rail 150, the increased diameter portion actuates the mechanically operated actuation valve 136. In response to air being delivered to the chamber from the secondary solenoid valve 142, the shift rail 150 is moved in a direction that results in the lock-up clutch 114 being moved towards the axle output gear 122 to cause the input shaft 112 to become drivingly engaged with the axially extending portion 126 of the first side gear 118. Further, in response to the shift rail 147 being moved in a direction that results in the engagement selector 116 being moved away from the axle output gear 122, the shift rail 147 contacts the shift rail toggle 135, causing the shift rail 150 to be moved in a direction that results in the lock-up clutch 114 to become drivingly engaged with the axially extending portion 126 of the first side gear 118. In response to air being delivered to the chamber of the actuator 148 from the solenoid valve 140 through the mechanically operated actuation valve 136, the shift rail 150 is moved in a direction that results in the lock-up clutch 114 being moved away from the axle output gear 122, drivingly disengaging the lock-up clutch 114 from the axially extending portion 126 of the first side gear 118.

The axle disconnect assembly 134 includes an axle clutch 152, a shift fork 154, and an axle actuator 156. In an embodiment, the axle clutch 152 is a dog style clutch that divides one of a pair of axle output shafts of the front axle assembly 108 into first and second portions. Alternately, the axle clutch 152 may be another clutching device as known in the art that provides a similar function. The shift fork 154 is drivingly engaged with the axle clutch 152 and the axle actuator 156 to facilitate the axle actuator 156 adjusting a position of the axle clutch 152. When the axle clutch 152 is in the engaged position, the first portion of one of the axle output shafts is drivingly engaged with the second portion of one of the axle output shafts.

When the engagement selector 116 is drivingly disengaged from the axle output gear 122, and no torque is transferred to the front axle assembly 108, the axle disconnect 134 is placed in a disengaged position.

The shift rail toggle 135 is a rigid member pivotally mounted adjacent both the shift rail 147 and the shift rail 150. The shift rail toggle 135 facilitates engagement of the lock-up clutch 114 in response to the shift rail 147 being moved in the direction that results in the engagement selector 116 being moved away from the axle output gear 122, such that the front axle assembly 108 is disengaged.

In an embodiment, the first mechanically operated actuation valve 136 is a multi-port spool valve having two positions. The mechanically operated actuation valve 136 is actuated by a movement of the shift rail 150 of the actuator 148. In response to actuation of the solenoid valves 140, 142 by the controller 144, the mechanically operated actuation valve 136 may be placed in two positions.

When the shift rail 150 is moved in a direction that results in the lock-up clutch 114 being moved away from the axle output gear 122, as shown in FIG. 1A, the mechanically operated actuation valve 136 is placed in a first position that allows fluid communication to occur between the solenoid valve 138 and the axle disconnect assembly 134 (placing the axle actuator 156 in an engaged position) and the chamber of the secondary shift rail assembly 133. In this position of the lock-up clutch 114, the inter-axle differential 106 is in an unlocked condition, where the axle output gear 122 and the output shaft 123 are driven through the inter-axle differential 106, which results in the tandem axle system 100 being placed in an open dual axle mode of operation, where the front axle assembly 108 and the rear axle assembly are driven through the inter-axle differential 106. In other words, the front and rear axle assemblies 108, 110 are in an open 6×4 state.

When the shift rail 150 is moved in a direction that results in the lock-up clutch 114 being moved towards the axle output gear 122 (in response to actuation of the solenoid valve 142, which is in direct fluid communication with the chamber of the secondary shift rail assembly actuator 148), the lock-up clutch 114 engages the first side gear 118. When the lock-up clutch 114 is engaged, the mechanically operated actuation valve 136 is placed in a second position that allows fluid communication between the axle disconnect assembly 134 and either the solenoid valve 138 or the solenoid valve 140. Fluid communication between the solenoid valve 140 and the axle disconnect assembly 134 places the axle actuator 156 in a disengaged position. Fluid communication between the solenoid valve 138 and the axle disconnect assembly 134 places the axle actuator 156 in an engaged position. Whether the axle disconnect assembly 134 is engaged or disengaged depends on a position of the mechanically operated actuation valve 137 (which controls fluid communication between the solenoid valves 138, 140 and the second actuation valve 136).

When the lock-up clutch 114 is engaged with the side gear 118, the inter-axle differential 106 is in a locked condition where the input shaft 112 is drivingly engaged with the first side gear 118 through the lock-up clutch 114. When the engagement selector 116 is engaged with the axle output gear 122, the position of the mechanically operated actuation valve 137 allows an engagement of the axle disconnect assembly 134 through the mechanically operated actuation valve 136. Thereby, a mode of operation of the tandem axle system 100 is adjusted from a single axle mode of operation to a dual axle mode of operation where the inter-axle differential 106 is placed in a locked condition. In other words, the front and rear axle assemblies 108, 110 are in a locked 6×4 state.

In an embodiment, the second mechanically operated actuation valve 137 is a multi-port spool valve having two positions. The mechanically operated actuation valve 137 is actuated by a movement of the shift rail 147 of the actuator 145. In response to actuation of the solenoid valves 138, 140 by the controller 144, the mechanically operated actuation valve 137 may be placed in two positions, to facilitate an operation of the mechanically operated actuation valve 136 and the axle disconnect assembly 134 as described hereinabove.

In an embodiment, the solenoid valve 138 is a three way electrically actuated solenoid valve having a normally closed position. However, in other embodiments the solenoid valve 138 may be another type of valve. The solenoid valve 138 is in fluid communication with a fluid supply 158, the chamber of the actuator 145, a portion of the mechanically operated actuation valve 137, and an exhaust conduit (not depicted). Further, the solenoid valve 138 is in electrical communication with the controller 144. When the solenoid valve 138 is in the normally closed position, a portion of the chamber of the actuator 145 is in fluid communication with the exhaust conduit through the solenoid valve 138, allowing the piston drivingly engaged with the shift rail 147 to displace air from the chamber of the actuator 145 to the exhaust conduit through the solenoid valve 138 and a conduit therebetween. In response to a signal from the controller 144, the solenoid valve 138 may be placed in an open position. In the open position, a portion of the chamber of the actuator 145 is in fluid communication with the fluid supply 158 through the solenoid valve 138, pressurizing the portion of the chamber and displacing the piston drivingly engaged with the shift rail 147, causing the engagement selector 116 to be moved towards the axle output gear 122.

In an embodiment, the solenoid valve 140 is a three way electrically actuated solenoid valve having a normally closed position. In another embodiment, the solenoid valve 140 may be another type of valve. The solenoid valve 140 is in fluid communication with the fluid supply 158, a portion of the mechanically operated actuation valve 137, and an exhaust conduit (not depicted). Further, the solenoid valve 140 is in electrical communication with the controller 144. When the solenoid valve 140 is in the normally closed position, a portion of the mechanically operated actuation valve 137 is in fluid communication with the exhaust conduit through the solenoid valve 140, allowing the axle actuator 156 of the axle disconnect assembly 134 to displace air to the exhaust conduit through the solenoid valve 140 and a conduit therebetween. In response to a signal from the controller 144, the solenoid valve 140 may be placed in an open position. In the open position, a portion of the chamber of the actuator 145 is in fluid communication with the fluid supply 158 through the solenoid valve 140 and the mechanically operated actuation valve 137, pressurizing the portion of the chamber and displacing the piston drivingly engaged with the shift rail 147, causing the engagement selector 116 to be moved away from the axle output gear 122.

In an embodiment, the secondary solenoid valve 142 is a three way electrically actuated solenoid valve having a normally closed position. In another embodiment, the secondary solenoid valve 142 may be another type of valve. The secondary solenoid valve 142 is in fluid communication with the fluid supply 158, the chamber of the actuator 148, and an exhaust conduit (not depicted). Further, the secondary solenoid valve 142 is in electrical communication with the controller 144. When the secondary solenoid valve 142 is in the normally closed position, a portion of the chamber of the actuator 148 is in fluid communication with the exhaust conduit through the secondary solenoid valve 142, allowing the piston drivingly engaged with the shift rail 150 to displace air from the chamber of the actuator 148 to the exhaust conduit through the secondary solenoid valve 142 and a conduit therebetween. In response to a signal from the controller 144, the secondary solenoid valve 142 may be placed in an open position. In the open position, a portion of the chamber of the actuator 148 is in fluid communication with the fluid supply 158 through the secondary solenoid valve 142, pressurizing the portion of the chamber and displacing the piston drivingly engaged with the shift rail 150, causing the lock-up clutch 114 to be moved towards the synchronizer 120, causing the lock-up clutch 114 to become drivingly engaged with the first side gear 118, thus placing the inter-axle differential 106 in a locked out condition.

The inter-axle differential 106 is a differential device rotatably disposed in a housing (not depicted) and is in driving engagement with the input shaft 112, the output shaft 123, and the synchronizer 120. As illustrated in FIG. 1A, the inter-axle differential 106 is a bevel gear style differential; however, it is understood that other differential types may be used. The inter-axle differential 106 comprises a spider 162, at least two pinion gears 164, the first side gear 118, and the second side gear 119. The inter-axle differential 106 facilitates differential action between the front axle assembly 108 and the rear axle assembly 110 when the tandem axle system 100 is placed in an open 6×4 mode of operation. The spider 162 is coupled with the input shaft 112 to facilitate torque transfer from the input shaft 112 to the inter-axle differential 106 when the tandem axle system 100 is in an open 6×4 mode of operation.

The front axle assembly 108 is an axle assembly including a pair of half shafts, an axle differential 50, and a ring gear as known in the art. The front axle assembly 108 is in driving engagement with the axle output gear 122 through a front axle drive pinion 170. The front axle drive pinion 170 is coupled with a pinion shaft 172. A transfer gear 174 is disposed about and coupled with the pinion shaft 172 for rotation therewith. In an embodiment, as illustrated in FIG. 1A, the transfer gear 174 is in constant meshed engagement with the axle output gear 122.

The rear axle assembly 110 comprises a pair of half shafts, an axle differential 60, and a ring gear as known in the art. In an embodiment, the rear axle assembly 110 is in driving engagement with the output shaft 123 through a Cardan shaft 70 and a rear axle drive pinion (not depicted).

The controller 144 is in communication with a power source 80, such as an internal combustion engine associated with the tandem axle system 100, at least one sensor 160, and the solenoid valves 138, 140, 142. In an embodiment, the controller 144 is in electrical communication with the power source 80, the at least one sensor 160, and the solenoid valves 138, 140, 142. The controller 144 may be in communication with the power source 80, the at least one sensor 160, and the solenoid valves 138, 140, 142 using electrical conductors, pneumatics, hydraulics, a wireless communication medium, or another type of communication. The controller 144, in co-operation with the at least one sensor 160 and the solenoid valves 138, 140, 142 form a control system for the tandem axle system 100.

Depending on a position of the lock-up clutch 114 and the engagement selector 116, as determined by an actuation of the solenoid valves 138, 140, 142 in response to communication from the controller 144, an operational mode of the tandem axle system 100 is adjusted. The tandem axle system 100 may be placed in a 6×2 mode of operation, an open 6×4 mode of operation, and locked 6×4 mode of operation (i.e., an inter-axle differential 106 locked mode of operation). In the open 6×4 mode of operation, both the front axle assembly 108 and the rear axle assembly (drivingly engaged with through the output shaft 123) are drivingly engaged with an input 112 of the tandem axle system 100 through the inter-axle differential 106. In the 6×2 mode of operation, only the rear axle assembly (drivingly engaged with through the output shaft 123) is drivingly engaged with the input 112 of the tandem axle system 100 through the inter-axle differential 106 placed in a locked out condition via the lock-up clutch 114. In the locked 6×4 mode of operation, both the front axle assembly 108 and the rear axle assembly (drivingly engaged with through the output shaft 123) are drivingly engaged with the input 112 of the tandem axle system 100 through the inter-axle differential 106 placed in a locked out condition via the lock-up clutch 114.

To place the tandem axle system 100 in the open 6×4 mode of operation, the controller 144 places the solenoid valve 138 in the open position and places the solenoid valve 140 and the secondary solenoid valve 142 in the closed position. To place the tandem axle system 100 in the locked 6×4 mode of operation, the controller 144 places the solenoid valve 138 and the secondary solenoid valve 142 in the open position and places the solenoid valve 140 in the closed position. To place the tandem axle system 100 in the 6×2 mode of operation, the controller 144 places the solenoid valve 140 in the open position and places the solenoid valve 138 and the secondary solenoid valve 142 in the closed position. The tandem axle system 100 described hereinabove and illustrated in FIG. 1A is a three mode shiftable tandem axle system having a sequential shift pattern. The sequential shift pattern of the tandem axle system 100 is as follows: the locked 6×4 mode of operation, the open 6×4 mode of operation (i.e., unlocked inter-axle differential 106), a neutral position, and the 6×2 mode of operation.

Figure 2:
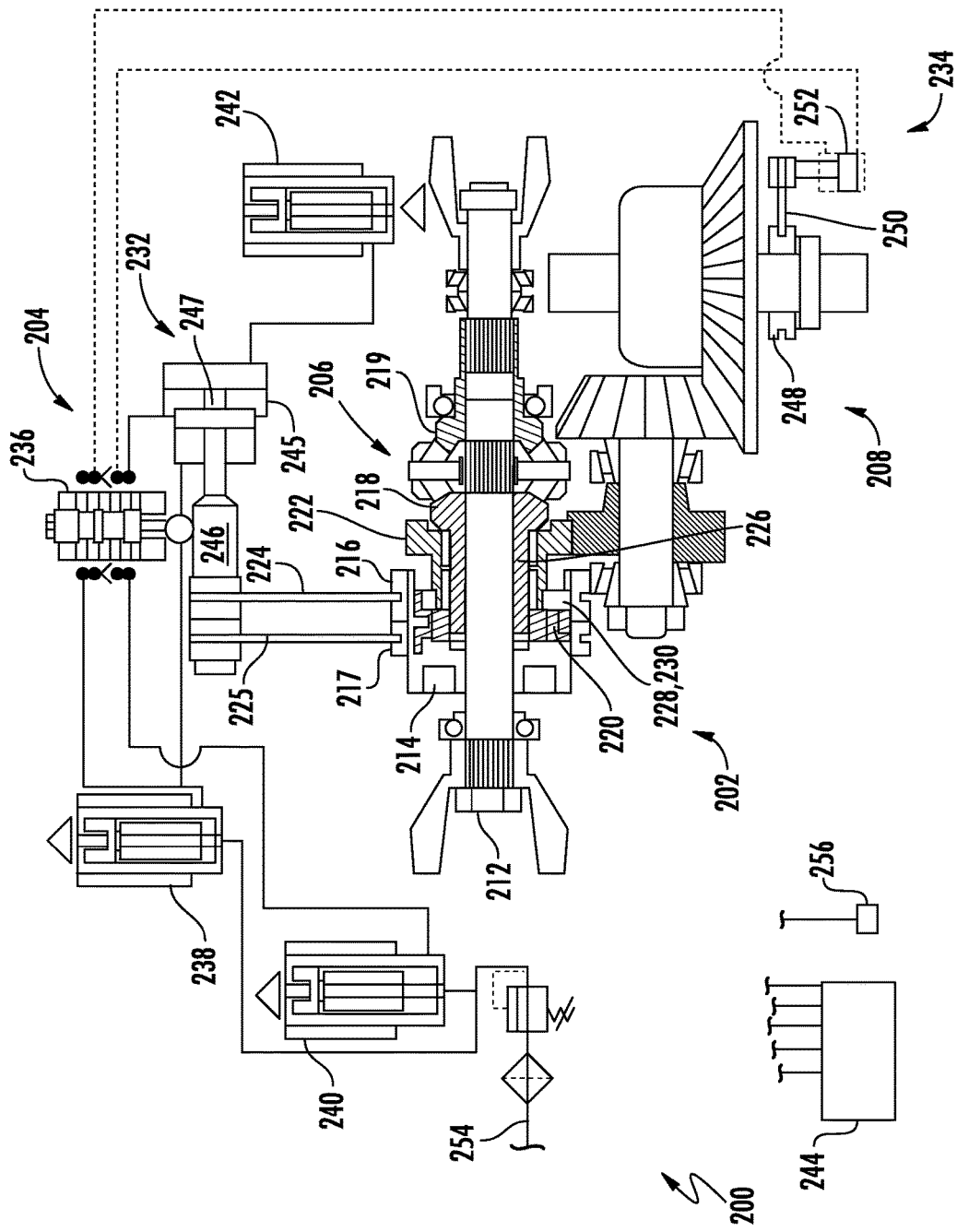
FIG. 2 illustrates a tandem axle system according to another embodiment of the presently disclosed subject matter.

FIG. 2 illustrates a tandem axle system 200. The tandem axle system 200 is a variation of the tandem axle system 100, and has similar features thereto. It is also understood that the tandem axle system 200 may not illustrate all of the features of the tandem axle system 100. The variation of the present subject matter shown in FIG. 2 includes similar components to the tandem axle system 100 illustrated in FIGS. 1A and 1. Similar features of the variation shown in FIG. 2 are numbered similarly in series. Different and additional features of the variation shown in FIG. 2 can be appreciated by one skilled in the art in view of FIG. 2 and the tandem axle system 100 illustrated in FIG. 1A.

As illustrated in FIG. 2, a tandem axle system 200 includes a mechanically operated shift assembly 202 (hereinafter referred to as a "shift assembly") according to an embodiment of the present subject matter. In an embodiment, the tandem axle system 200 also includes an actuation assembly 204, an inter-axle differential 206, a front axle assembly 208, and a rear axle assembly (not depicted). The front axle assembly 208 and the rear axle assembly are in selective driving engagement with the inter-axle differential 206 and the shift assembly 202. The actuation assembly 204 is in driving engagement with a portion of the shift assembly 202 and the front axle assembly 208. The front axle assembly 208 and the rear axle assembly are well known in the art.

The shift assembly 202 is disposed about an input shaft 212 of the tandem axle system 200. The shift assembly 202 includes an input gear 214, a first engagement selector 216, a second engagement selector 217, a first side gear 218 of the inter-axle differential 206, a second side gear 219 of the inter-axle differential 206, a synchronizer 220, and an axle output gear 222. The first side gear 218 may be drivingly engaged with the front axle assembly 208 through the synchronizer 220 and the axle output gear 222. The second side gear 219 may be drivingly engaged with the rear axle assembly through an output shaft (not depicted), such as a Cardan shaft.

The input gear 214 is disposed on and engaged with the input shaft 212, such as through, but not limited to, a plurality of splines formed on the input gear 214 and the input shaft 212. An outer surface of the input gear 214 has a plurality of teeth formed thereon for engaging the first engagement selector 216 and the second engagement selector 217.

The first engagement selector 216 is disposed about and drivingly engaged with the synchronizer 220. The first engagement selector 216 may also be drivingly engaged with the input gear 214 and a portion of the axle output gear 222. An inner surface of the first engagement selector 216 has a plurality of teeth formed thereon for engaging an outer surface of the synchronizer 220, a portion of the axle output gear 222, and the input gear 214. The first engagement selector 216 may be slidably moved along the outer surface of the synchronizer 220. An outer surface of the first engagement selector 216 is configured for engagement with a first shift fork 224 of the actuation assembly 204.

The second engagement selector 217 is disposed about and drivingly engaged with the input gear 214. The second engagement selector 217 may also be drivingly engaged with the synchronizer 220. An inner surface of the second engagement selector 217 has a plurality of teeth formed thereon for engaging the input gear 214 and the outer surface of the synchronizer 220. The second engagement selector 217 may be slidably moved along the outer surface of the input gear 214. An outer surface of the second engagement selector 217 is configured for engagement with a second shift fork 225 of the actuation assembly 204.

The first side gear 218 of the inter-axle differential 206 includes an axially extending portion 226. The first side gear 218 is disposed on and rotatable with respect to the input shaft 212. A plurality of bearings disposed between the input shaft 212 and the first side gear 218 facilitate rotation therebetween. A distal end of the axially extending portion 226 extends in a radial manner and includes a plurality of teeth formed thereon.

The synchronizer 220 is disposed on and engaged with the axially extending portion 226 of the first side gear 218. An inner surface of the synchronizer 220 includes a plurality of teeth formed thereon for engaging the axially extending portion 226. An outer surface of the synchronizer 220 includes a plurality of teeth formed thereon for engaging the inner surface of the first and second engagement selectors 216, 217. The synchronizer 220 may be slidably moved along a portion of the axially extending portion 226. The synchronizer 220 includes a first conical engagement face 228 for variably engaging a portion of the axle output gear 222 in a manner that facilitates synchronization.

The axle output gear 222 is disposed on and rotatable with respect to the axially extending portion 226 of the first side gear 218. A plurality of bearings disposed between the axle output gear 222 and the first side gear 218 facilitate rotation therebetween. A first distal end of the axle output gear 222 extends in a radial manner and includes a plurality of teeth and a second conical engagement face 230 formed thereon. The first distal end of the axle output gear 222 may be variably engaged with the synchronizer 220 and drivingly engaged with the first engagement selector 216 in response to movement of the engagement selector 216. A second distal end of the axle output gear 222 extends in a radial manner and includes a plurality of teeth formed thereon for engaging the front axle assembly 208. In another embodiment, the axle output gear 222 of the tandem axle system 200 including the shift assembly 202 may be configured to engage the rear axle assembly.

The actuation assembly 204 comprises a shift rail assembly 232, an axle disconnect assembly 234, a mechanically operated actuation valve 236, a pair of primary solenoid valves 238, 240, a secondary solenoid valve 242, and a controller 244. The actuation assembly 204 is in fluid communication with a filtered and pressure regulated fluid supply 254. As a non-limiting example, the filtered and pressure regulated fluid supply may be an air supply. The actuation assembly 204 is in driving engagement with the first and second engagement selectors 216, 217 of the shift assembly 202, and a portion of the front axle assembly 208.

The shift rail assembly 232 includes an actuator 245, the shift forks 224, 225, and a shift rail 246. The actuator 245 is pressure driven by the solenoid valve 238, the solenoid valve 240 through the mechanically operated actuation valve 236, or the solenoid valve 242. The actuator 245 includes a chamber into which two pistons are sealingly disposed. A first piston is disposed about and connected to the shift rail 246. The shift rail 246 is in driving engagement with the shift fork 224 and the shift fork 225. The shift fork 225 is disposed adjacent to the shift fork 224. A second piston is disposed adjacent to an end portion 247 of the shift rail 246.

In response to movement of the second piston in a direction towards the shift rail 246, the second piston moves the shift rail 246, the shift fork 225, and the second engagement selector 217. The two pistons divide the chamber into three zones, each of which is in respective fluid communication with the solenoid valves 238, 240, 242. The shift rail 246 is an elongate member having a portion with an increased diameter which acts as a linear cam to actuate the mechanically operated actuation valve 236.

As illustrated in FIG. 2, the shift rail 246 is positioned adjacent to the mechanically operated actuation valve 236. In response to movement of the shift rail 246, the increased diameter portion actuates the mechanically operated actuation valve 236. In response to air being delivered to the actuator 245 chamber from the solenoid valve 238, the shift rail 246 is moved in a direction that results in the first engagement selector 216 being moved towards the axle output gear 222 until the first piston, drivingly engaged with the shift rail 246, is moved to a limit of its chamber. In response to air being delivered to the chamber from the solenoid valve 240 through the mechanically operated actuation valve 236, the shift rail 246 is moved in a direction that results in the first engagement selector 216 being moved away from the axle output gear 222, until the first piston, drivingly engaged with the shift rail 246, reaches a limit of the chamber. Further, the second engagement selector 217 moves in the same direction as the first engagement selector when the shift rail 246 is actuated.

In response to air being delivered to the chamber of the actuator 245 from the solenoid valves 238, 242, the first piston is positioned intermediate its limits within the chamber. The shift rail 246 is moved in a direction that results in the first engagement selector 216 being moved towards the axle output gear 222, until the shift rail end portion 247 contacts the second piston. The second piston, not drivingly engaged with the shift rail 246, is moved to a limit of its chamber towards a forward end of the vehicle. Consequently, when air is delivered to the chamber of the actuator 245 from both the solenoid valves 238, 242, the engagement selectors 216, 217 are disposed in a position intermediate their limits.

The axle disconnect assembly 234 includes an axle clutch 248, a shift fork 250, and an axle actuator 252. The axle clutch 248 is a dog style clutch that divides one of a pair of axle output shafts of the front axle assembly 208 into first and second portions. Alternately, the axle clutch 248 may be another clutching device as known in the art that provides a similar function. The shift fork 250 is drivingly engaged with the axle clutch 248 and the axle actuator 252 to facilitate the axle actuator 252 adjusting a position of the axle clutch 248. When the axle clutch 248 is in the engaged position, the first portion of one of the axle output shafts is drivingly engaged with the second portion of one of the axle output shafts.

The mechanically operated actuation valve 236 is a multi-port spool valve having two positions. The mechanically operated actuation valve 236 is actuated by a movement of the shift rail 246 of the actuator 245. In response to actuation of the solenoid valves 238, 240 by the controller 244, the mechanically operated actuation valve 236 may be placed in two positions.

When the shift rail 246 is moved in a direction that results in the engagement selector 216 being moved away from the axle output gear 222, the mechanically operated actuation valve 236 is placed in a first position that allows fluid communication to occur between the solenoid valve 240 and the axle disconnect assembly 234 (placing the axle actuator 252 in a disengaged position). The mechanically operated actuation valve 236 in the first position also allows fluid communication between the solenoid valve 240 and the chamber of the shift rail assembly 232 between the first and second pistons. When such positioning of the shift rail 246 occurs, the first piston reaches a forward limit of the actuator 245 chamber. Such a positioning of the shift rail 246 urges the engagement selectors 216, 217 away from the axle output gear 222 and places the inter-axle differential 206 in a locked condition where the engagement selector 216 is drivingly engaged with the input gear 214 and the synchronizer 220. In such a position, the axle output gear 222 is drivingly disengaged from the input shaft 212 and the first side gear 218, and the output shaft is driven by the input shaft 212 through the locked inter-axle differential 206. When the engagement selector 216 is in such a position, a geared portion of the inner surface of the engagement selector 216 is simultaneously drivingly engaged with both the input gear 214 and the synchronizer 220, causing the input shaft 212 to be drivingly engaged with the first side gear 218. This mode of operation of the tandem axle system 200 may be referred to as the 6×2 mode of operation, where the inter-axle differential 206 is placed in a locked condition and the axle actuator 252 is placed in the disengaged position.

When the shift rail 246 is moved in a direction that results in the engagement selectors 216, 217 being moved towards the axle output gear 222 (in response to actuation of the solenoid valve 238, which is in direct fluid communication with the actuator 245 chamber of the shift rail assembly 232), the mechanically operated actuation valve 236 is placed in a second position that allows fluid communication to occur between the solenoid valve 238 and the axle disconnect assembly 234 (placing the axle actuator 252 in an engaged position). Simultaneously, in response to the actuation of the solenoid valve 238, the second piston, disposed adjacent the shift rail end portion 247, is moved towards the axle output gear 222 to a limit of its chamber as a result of the displacement of air caused by the movement of the first piston. Consequently, the engagement selector 217 is moved towards the axle output gear 222, engaging both the input gear 214 and the synchronizer 220. Such a positioning of the engagement selectors 216, 217 places the inter-axle differential 206 in a locked condition where the axle output gear 222 is drivingly engaged with the input shaft 212 and the first side gear 218 through the engagement selectors 216, 217, and the output shaft is driven by the input shaft 212 through the locked inter-axle differential 206. When the engagement selector 216 is in such a position, a geared portion of the inner surface of the engagement selector 216 is drivingly engaged with the synchronizer 220 and the axle output gear 222. When the engagement selector 217 is in such a position, a geared portion of the inner surface of the engagement selector 217 is drivingly engaged with the input gear 214 and the synchronizer 220. As a result of such a positioning of the engagement selectors 216, 217, the input shaft 212 is drivingly engaged with the first side gear 218 and the output gear 222. This mode of operation of the tandem axle system 200 may be referred to as the 6×4 locked mode of operation, which is illustrated in FIG. 2. In the locked 6×4 mode of operation, the inter-axle differential 206 is placed in a locked condition and the axle actuator 252 is placed in the engaged position.

When the shift rail 246 is moved in a direction that results in the engagement selectors 216, 217 being moved towards the axle output gear 222 (in response to actuation of the solenoid valve 238, which is in direct fluid communication with the actuator 245 chamber of the shift rail assembly 232), the mechanically operated actuation valve 236 is placed in a second position that allows fluid communication to occur between the solenoid valve 238 and the axle disconnect assembly 234 (placing the axle actuator 252 in an engaged position). Simultaneously, in response to the actuation of the solenoid valve 242, the second piston, disposed adjacent to the shift rail end portion 247, is moved away from the axle output gear 222 (and thus to a forward limit of its chamber as a result of air pressure applied by the solenoid valve 242), and urging the shift rail 246 away from the axle output gear 222. Consequently, the engagement selector 217 is moved away from the axle output gear 222, engaging only the input gear 214. Such a positioning of the engagement selectors 216, 217 places the inter-axle differential 206 in an unlocked condition where the axle output gear 222 is drivingly engaged with the first side gear 218 through the engagement selector 216, and the output shaft is driven by the second side gear 219 through the inter-axle differential 206 placed in the unlocked condition. When the engagement selector 216 is in such a position, a geared portion of the inner surface of the engagement selector 216 is drivingly engaged with the synchronizer 220 and the axle output gear 222. When the engagement selector 217 is in such a position, a geared portion of the inner surface of the engagement selector 217 is drivingly engaged only with the input gear 214. As a result of such a positioning of the engagement selectors 216, 217, the input shaft 212 is drivingly engaged with the inter-axle differential 206, facilitating differential action between the first side gear 218 and the second side gear 219 as needed. This mode of operation of the tandem axle system 200 may be referred to as the 6×4 unlocked (i.e., open) mode of operation. In the open 6×4 mode of operation, the inter-axle differential 206 is placed in the unlocked condition and the axle actuator 252 is placed in the engaged position.

The solenoid valve 238 is a three way electrically actuated solenoid valve having a normally closed position; however, it is understood that the solenoid valve 238 may be another type of valve. The solenoid valve 238 is in fluid communication with a fluid supply 254, the chamber of the actuator 245, a portion of the mechanically operated actuation valve 236 and an exhaust conduit (not depicted). Further, the solenoid valve 238 is in electrical communication with the controller 244. When the solenoid valve 238 is in the normally closed position, a portion of the chamber of the actuator 245 is in fluid communication with the exhaust conduit through the solenoid valve 238, allowing the piston drivingly engaged with the shift rail 246 to displace air from the chamber of the actuator 245 to the exhaust conduit through the solenoid valve 238 and a conduit therebetween. In response to a signal from the controller 244, the solenoid valve 238 may be placed in an open position. In the open position, a portion of the chamber of the actuator 245 is in fluid communication with the fluid supply 254 through the solenoid valve 238, pressurizing the portion of the chamber and displacing the piston drivingly engaged with the shift rail 246, causing the engagement selector 216 to be moved towards the axle output gear 222.

The solenoid valve 240 is a three way electrically actuated solenoid valve having a normally closed position; however, it is understood that the solenoid valve 240 may be another type of valve. The solenoid valve 240 is in fluid communication with the fluid supply 254, a portion of the mechanically operated actuation valve 236, and an exhaust conduit (not depicted). Further, the solenoid valve 240 is in electrical communication with the controller 244. When the solenoid valve 240 is in the normally closed position, a portion of the mechanically operated actuation valve 236 is in fluid communication with the exhaust conduit through the solenoid valve 240, allowing the axle actuator 252 of the axle disconnect assembly 234 to displace air to the exhaust conduit through the solenoid valve 240 and a conduit therebetween. In response to a signal from the controller 244, the solenoid valve 240 may be placed in an open position. In the open position, a portion of the chamber of the actuator 245 is in fluid communication with the fluid supply 254 through the solenoid valve 240 and the mechanically operated actuation valve 236, pressurizing the portion of the chamber and displacing the first piston, drivingly engaged with the shift rail 246, and the second piston disposed adjacent the shift rail end portion 247, causing the engagement selectors 216, 217 to be moved away from the axle output gear 222.

The solenoid valve 242 is a three way electrically actuated solenoid valve having a normally open position; however, it is understood that the solenoid valve 242 may be another type of valve. The solenoid valve 242 is in fluid communication with the fluid supply 254, the chamber of the actuator 245, and an exhaust conduit (not depicted). Further, the solenoid valve 242 is in electrical communication with the controller 244. When the solenoid valve 242 is in the normally open position, a portion of the chamber of the actuator 245 adjacent the second piston is in fluid communication with the exhaust conduit through the solenoid valve 242, allowing the second piston to displace air to the exhaust conduit through the solenoid valve 242 and a conduit therebetween. In response to a signal from the controller 244, the solenoid valve 242 may be placed in a closed position. In the closed position, a portion of the chamber of the actuator 245 adjacent the second piston disposed adjacent the shift rail end portion 247 is in fluid communication with the fluid supply 254 through the solenoid valve 242, pressurizing a portion of the chamber of the actuator 245 adjacent the second piston and displacing the second piston, causing the second piston to contact and displace the shift rail 246 partially within the chamber, causing the engagement selector 216 to be moved away from the axle output gear 222. The effect of the second piston being displaced and moving the shift rail 246 within the chamber is that the engagement selector 216 becomes disengaged from both the input gear 214 and the synchronizer 220 and becomes solely engaged with the input gear 214.

The controller 244 is in communication with a power source (not depicted), such as an internal combustion engine associated with the tandem axle system 200, at least one sensor 256, and the solenoid valves 238, 240, 242. Preferably, the controller 244 is in electrical communication with the power source, the at least one sensor 256, and the solenoid valves 238, 240, 242. The controller 244 may be in communication with the power source, the at least one sensor 256, and the solenoid valves 238, 240, 242 using electrical conductors, pneumatics, hydraulics, a wireless communication medium, or another type of communication. The controller 244, in co-operation with the at least one sensor 256 and the solenoid valves 238, 240, 242 form a control system for the tandem axle system 200. The at least one sensor 256 may be configured to provide information to the controller 244 regarding a status of engagement of at least one of the actuators 245, 252, the mechanically operated actuation valve 236, the solenoid valves 238, 240, 242, or a condition of operation of a mechanical component of the tandem axle system 200. The tandem axle system 200 described hereinabove and illustrated in FIG. 2 is a three mode shiftable tandem axle system having a sequential shift pattern. The sequential shift pattern of the tandem axle system 200 is as follows: the 6×4 IAD lock mode of operation, the 6×4 unlocked mode of operation, a neutral position, and the 6×2 mode of operation.

FIGS. 3A, 3B, 3C, and 3D illustrate at least a portion of a tandem axle system 300. The tandem axle system 300 is a variation of the tandem axle system 100, and has similar features thereto. It is also understood that the tandem axle system 300 may not illustrate all of the features of the tandem axle system 100. The variation of the present subject matter shown in FIGS. 3A, 3B, and 3C includes similar components to the tandem axle system 100 illustrated in FIG. 1A. Similar features of the variation shown in FIGS. 3A, 3B, 3C, and 3D are numbered similarly in series. Different and additional features of the embodiment shown in FIGS. 3A, 3B, and 3C can be appreciated by one skilled in the art in view of FIGS. 3A, 3B, and 3C and the tandem axle system 100 illustrated in FIG. 1A.

As illustrated in FIGS. 3A, 3B, 3C, and 3D, in an embodiment, the tandem axle system 300 includes a mechanically operated shift assembly 302 (hereinafter referred to as a "shift assembly"). In an embodiment, the tandem axle system 300 also includes an actuation assembly 304, an inter-axle differential 306, a front axle assembly 308, and a rear axle assembly 310. The front axle assembly 308 and the rear axle assembly 310 are in selective driving engagement with the inter-axle differential 306 and the shift assembly 302. The actuation assembly 304 is in driving engagement with a portion of the shift assembly 302 and the front axle assembly 308. The front axle assembly 308 and the rear axle assembly 310 are well known in the art.

The shift assembly 302 is disposed about an input shaft 312 of the tandem axle system 300. The shift assembly 302 includes an input gear 314, an engagement selector 316, a first side gear 318 of the inter-axle differential 306, a second side gear 319 of the inter-axle differential 306, a synchronizer 320, and an axle output gear 322. The first side gear 318 may be drivingly engaged with the front axle assembly 308 through the synchronizer 320 and the axle output gear 322. The second side gear 319 may be drivingly engaged with the rear axle assembly 310 through an output shaft 323.

The input gear 314 is disposed on and engaged with the input shaft 312, such as through, but not limited to, a plurality of splines formed on the input gear 314 and the input shaft 312. An outer surface of the input gear 314 has a plurality of teeth formed thereon.

The engagement selector 316 is disposed on and engaged with the input gear 314. As illustrated in FIG. 3C, an inner surface of the engagement selector 316 has two geared portions and an ungeared portion disposed between the geared portions. The engagement selector 316 may be slidably moved along the outer surface of the input gear 314. The engagement selector 316 ungeared portion is at least as wide as the input gear 314. An outer surface of the engagement selector 316 is configured for engagement with a shift fork 324 of the actuation assembly 304.

The first side gear 318 of the inter-axle differential 306 includes an axially extending portion 326. The first side gear 318 is disposed on and rotatable with respect to the input shaft 312. A plurality of bearings disposed between the input shaft 312 and the first side gear 318 facilitate rotation therebetween. A distal end of the axially extending portion 326 extends in a radial manner and includes a plurality of teeth formed thereon.

The synchronizer 320 is disposed on and engaged with the axially extending portion 326 of the first side gear 318. An inner surface of the synchronizer 320 includes a plurality of teeth formed thereon for engaging the axially extending portion 326. An outer surface of the synchronizer 320 includes a plurality of teeth formed thereon for engaging the inner surface of the engagement selector 316. The synchronizer 320 may be slidably moved along a portion of the axially extending portion 326. The synchronizer 320 includes a first conical engagement face 328 for variably engaging a portion of the axle output gear 322 in a manner that facilitates synchronization.

The axle output gear 322 is disposed on and rotatable with respect to the axially extending portion 326 of the first side gear 318. A plurality of bearings disposed between the axle output gear 322 and the first side gear 318 facilitate rotation therebetween. A first distal end of the axle output gear 322 extends in a radial manner and includes a plurality of teeth and a second conical engagement face 330 formed thereon. The first distal end of the axle output gear 322 may be variably engaged with the synchronizer 320 and drivingly engaged with the engagement selector 316 in response to movement of the engagement selector 316. A second distal end of the axle output gear 322 extends in a radial manner and includes a plurality of teeth formed thereon for engaging the front axle assembly 308, however, it is understood that the axle output gear 322 of the tandem axle system 300 including the shift assembly 302 may be configured to engage the rear axle assembly 310.

The actuation assembly 304 comprises a primary shift rail assembly 332, an axle disconnect assembly 334, a mechanically operated actuation valve 336, a pair of primary solenoid valves 338, 340, a secondary solenoid valve 342, and a controller 344. The actuation assembly 304 is in fluid communication with a filtered and pressure regulated fluid supply. As a non-limiting example, the filtered and pressure regulated fluid supply may be an air supply. The actuation assembly 304 is in driving engagement with the engagement selector 316 of the shift assembly 302 and a portion of the front axle assembly 308.

The primary shift rail assembly 332 includes an actuator 346, the shift fork 324, and a shift rail 347. The actuator 346 is pressure driven by the solenoid valve 338, the solenoid valve 340 through the mechanically operated actuation valve 336, or the solenoid valve 342. The actuator 346 includes a chamber into which two pistons are sealingly disposed. The shift rail 347 is disposed through and coupled with a first piston, and comprises an end disposed adjacent to a second piston. The shift rail 347 is in driving engagement with the shift fork 324. The two pistons divide the chamber into three zones, each of which is in respective fluid communication with the solenoid valves 338, 340, 342. Further, the shift rail 347 is an elongate member having a portion with an increased diameter which acts as a linear cam to actuate the mechanically operated actuation valve 336.

Figure 3A:
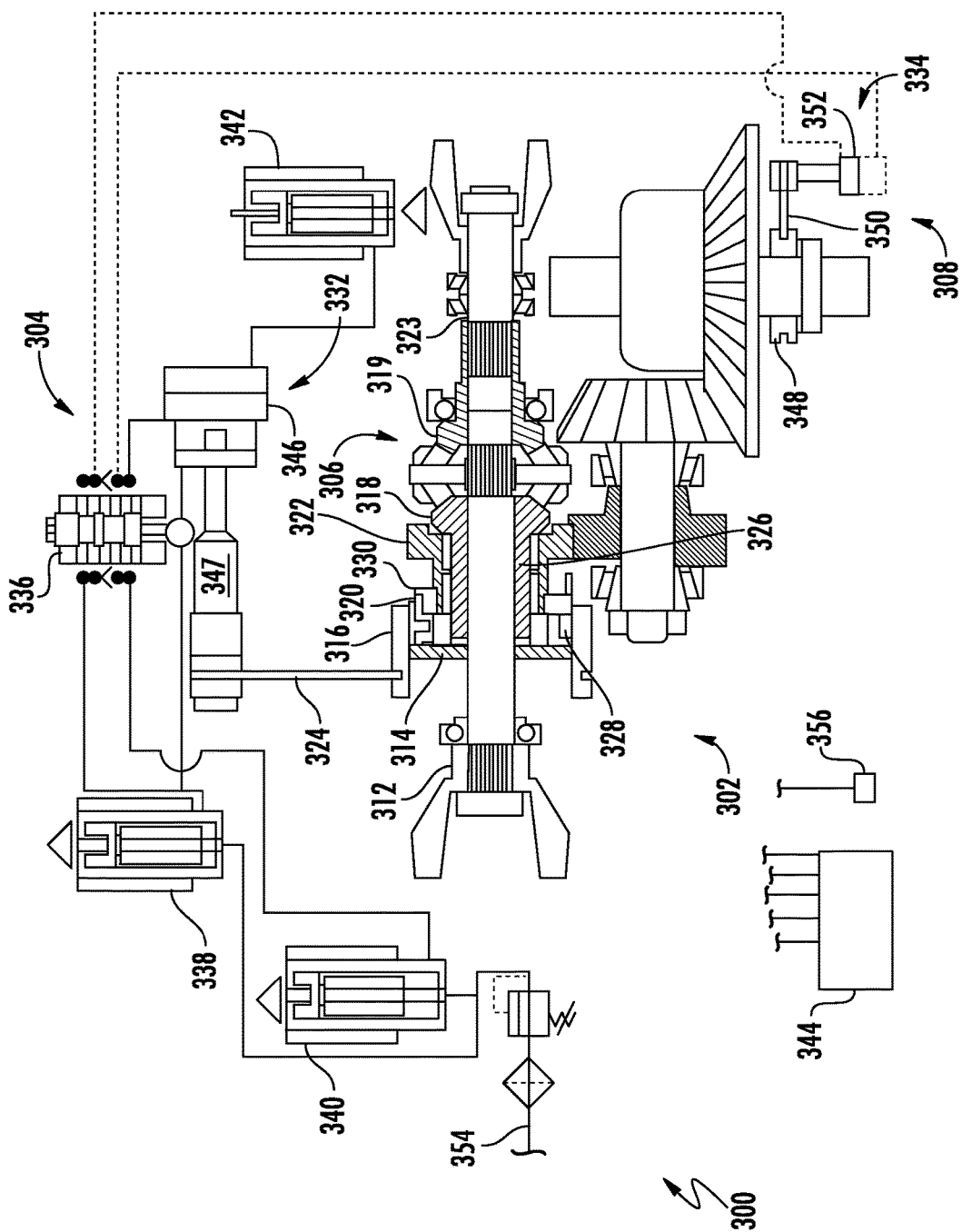
FIG. 3A illustrates a tandem axle system according to yet another embodiment of the presently disclosed subject matter.
Figure 3B:
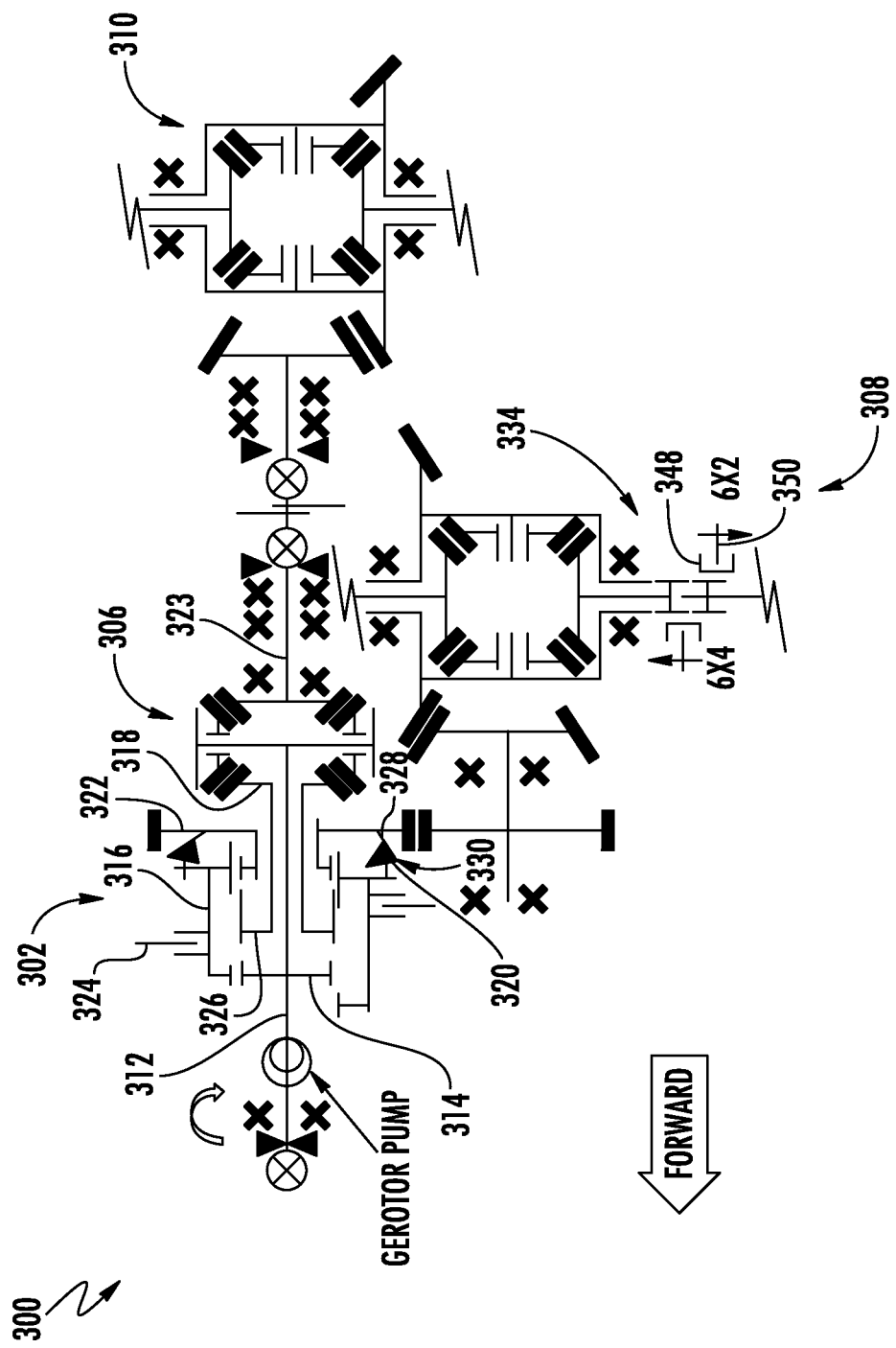
FIG. 3B is a schematic of a tandem axle system according to the embodiment illustrated in FIG. 3A.
Figure 3C:
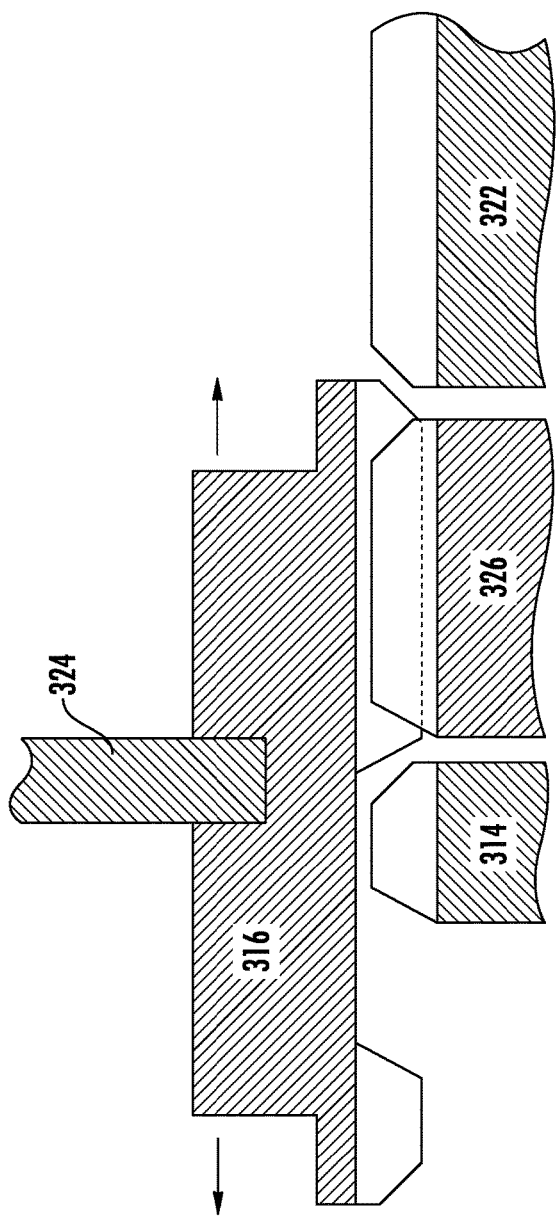
FIG. 3C is a sectional view of an engagement selector, an input gear, an axially extending portion of a first side gear, and an axle output gear according to FIG. 3A.
Figure 3D:
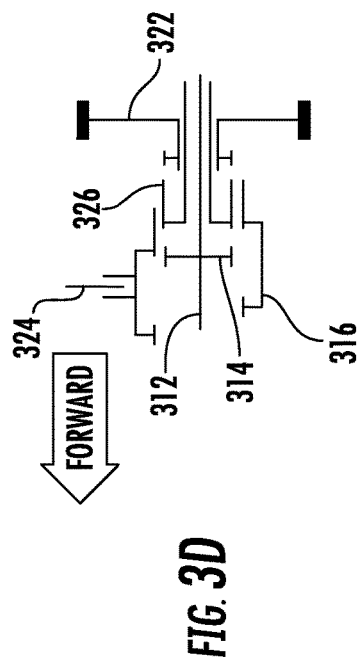
FIG. 3D is a schematic of a portion of a mechanically operated shift assembly according to the embodiment illustrated in FIG. 3B in a neutral operation state.

As shown in FIG. 3A, the shift rail 347 is positioned adjacent the mechanically operated actuation valve 336. In response to movement of the shift rail 347, the increased diameter portion actuates the mechanically operated actuation valve 336. In response to air being delivered to the chamber from the solenoid valve 338, the shift rail 347 is moved in a direction that results in the engagement selector 316 being moved towards the axle output gear 322, until the shift rail 347 contacts the second piston (the piston not coupled with the shift rail 347), and the second piston is moved to a limit of its chamber. As shown in FIG. 3A, in response to air being delivered to the chamber from the solenoid valve 340 through the mechanically operated actuation valve 336, the shift rail 347 is moved in a direction that results in the engagement selector 316 being moved away from the axle output gear 322, until the piston drivingly engaged with the shift rail 347 reaches a limit of the chamber. In response to air being delivered to the chamber from the solenoid valves 338, 342, the shift rail 347 is moved by the second piston in a direction that results in the engagement selector 316 being moved away from the axle output gear 322, but not until the piston drivingly engaged with the shift rail 347 reaches a limit of the chamber.

The axle disconnect assembly 334 includes an axle clutch 348, a shift fork 350, and an axle actuator 352. The axle clutch 348 is a dog style clutch that divides one of a pair of axle output shafts of the front axle assembly 308 into first and second portions. Alternately, the axle clutch 348 may be another clutching device as known in the art that provides a similar function. The shift fork 350 is drivingly engaged with the axle clutch 348 and the axle actuator 352 to facilitate the axle actuator 352 adjusting a position of the axle clutch 348. When the axle clutch 348 is in the engaged position, the first portion of one of the axle output shafts is drivingly engaged with the second portion of one of the axle output shafts.

The mechanically operated actuation valve 336 is a multi-port spool valve having two positions. The mechanically operated actuation valve 336 is actuated by a movement of the shift rail 347 of the actuator 346. In response to actuation of the solenoid valves 338, 340, 342 by the controller 344, the mechanically operated actuation valve 336 may be placed in two positions.

When the shift rail 347 is moved in a direction that results in the engagement selector 316 being moved away from the axle output gear 322, as shown in FIG. 3A, the mechanically operated actuation valve 336 is placed in a first position that allows fluid communication to occur between the solenoid valve 340 and the axle disconnect assembly 334 (placing the axle actuator 352 in a disengaged position) and the actuator chamber 346 of the primary shift rail assembly 332 between the pistons. When such positioning of the shift rail 347 occurs, the piston drivingly engaged with the shift rail 347 reaches a limit of the chamber. Such a positioning of the engagement selector 316 places the inter-axle differential 306 in a locked condition, where the axle output gear 322 is drivingly disengaged from the input shaft 312 and the first side gear 318. Further, in this position of the engagement selector 316 the output shaft 323 is driven by the input shaft 312 through the locked (i.e., closed) inter-axle differential 306. When the engagement selector 316 is in such a position, a geared portion of the inner surface of the engagement selector 316 is simultaneously drivingly engaged with both the input gear 314 and the synchronizer 320, causing the input shaft 312 to be drivingly engaged with the first side gear 318. This mode of operation of the tandem axle system 300 may be referred to as the 6×2 mode of operation, where the inter-axle differential 306 is placed in a locked condition and the axle actuator 352 is placed in the disengaged position.

When the shift rail 347 is moved in a direction that results in the engagement selector 316 being moved towards the axle output gear 322 (in response to actuation of the solenoid valve 338, which is in direct fluid communication with the chamber of the primary shift rail assembly 332), the mechanically operated actuation valve 336 is placed in a second position that allows fluid communication to occur between the solenoid valve 338 and the axle disconnect assembly 334 (placing the axle actuator 352 in an engaged position). When such positioning of the shift rail 347 occurs, the shift rail 347 contacts the piston it is not drivingly engaged with, and the piston it is not drivingly engaged is moved to a limit of its chamber. Such a positioning of the engagement selector 316 places the inter-axle differential 306 in a locked condition where the axle output gear 322 is drivingly engaged with the input shaft 312 and the first side gear 318 through the engagement selector 316, and the output shaft 323 is driven by the input shaft 312 through the inter-axle differential 306 placed in a locked condition. When the engagement selector 316 is in such a position, a first geared portion of the inner surface of the engagement selector 316 is drivingly engaged with the input gear 314 and the second geared portion of the inner surface of the engagement selector 316 is simultaneously drivingly engaged with both the synchronizer 320 and the output gear 322, causing the input shaft 312 to be drivingly engaged with the first side gear 318 and the output gear 322. This mode of operation of the tandem axle system 300 may be referred to as the 6×4 locked mode of operation, where the inter-axle differential 306 is placed in a locked condition and the axle actuator 352 is placed in the engaged position.

When the shift rail 347 is moved in the direction that results in the engagement selector 316 being moved towards the axle output gear 322 but not to a point where the piston not drivingly engaged the shift rail 347 is moved to a limit of its chamber (in response to actuation of both of the solenoid valves 338, 342, which are in direct fluid communication with the chambers of the primary shift rail assembly 332 to move the pistons thereof), the mechanically operated actuation valve 336 remains in the second position (as described herein). When such positioning of the shift rail 347 occurs, the shift rail 347 contacts the piston it is not drivingly engaged with, and the piston it is not drivingly engaged with prevents further movement of the shift rail 347, resulting in the shift rail 347 being positioned intermediate its limits. When this movement occurs, the engagement selector 316 becomes disengaged from the input gear 314 of the input shaft 312 because the ungeared portion of the engagement selector 316 is aligned with the input gear 314. Such a positioning of the engagement selector 316 places the inter-axle differential 306 in an unlocked condition, where the axle output gear 322 is drivingly engaged with the first side gear 318 through the engagement selector 316 and the input gear 314 is free to rotate within the engagement selector 316, and the axle output gear 322 and the output shaft 323 are driven through the inter-axle differential 306. This mode of operation of the tandem axle system 300 may be referred to as the open 6×4 mode of operation, where the inter-axle differential 306 is placed in an unlocked condition and the axle actuator 352 is placed in the engaged position.

The solenoid valve 338 is a three way electrically actuated solenoid valve having a normally closed position; however, it is understood that the solenoid valve 338 may be another type of valve. The solenoid valve 338 is in fluid communication with the fluid supply 354, the chamber of the actuator 346, a portion of the mechanically operated actuation valve 336 and an exhaust conduit (not depicted). Further, the solenoid valve 338 is in electrical communication with the controller 344. When the solenoid valve 338 is in the normally closed position, a portion of the chamber of the actuator 346 is in fluid communication with the exhaust conduit through the solenoid valve 338, allowing the piston drivingly engaged with the shift rail 347 to displace air from the chamber of the actuator 346 to the exhaust conduit through the solenoid valve 338 and a conduit therebetween. In response to a signal from the controller 344, the solenoid valve 338 may be placed in an open position. In the open position, a portion of the chamber of the actuator 346 is in fluid communication with the fluid supply 354 through the solenoid valve 338, pressurizing the portion of the chamber and displacing the piston drivingly engaged with the shift rail 347, causing the engagement selector 316 to be moved towards the axle output gear 322.

The solenoid valve 340 is a three way electrically actuated solenoid valve having a normally closed position; however, it is understood that the solenoid valve 340 may be another type of valve. The solenoid valve 340 is in fluid communication with the fluid supply 354, a portion of the mechanically operated actuation valve 336, and an exhaust conduit (not depicted). Further, the solenoid valve 340 is in electrical communication with the controller 344. When the solenoid valve 340 is in the normally closed position, a portion of the mechanically operated actuation valve 336 is in fluid communication with the exhaust conduit through the solenoid valve 340, allowing the axle actuator 352 of the axle disconnect assembly 334 to displace air to the exhaust conduit through the solenoid valve 340 and a conduit therebetween. In response to a signal from the controller 344, the solenoid valve 340 may be placed in an open position. In the open position, a portion of the chamber of the actuator 346 is in fluid communication with the fluid supply 354 through the solenoid valve 340 and the mechanically operated actuation valve 336, pressurizing the portion of the chamber and displacing the piston drivingly engaged with the shift rail 347, causing the engagement selector 316 to be moved away from the axle output gear 322.

The solenoid valve 342 is a three way electrically actuated solenoid valve having a normally open position; however, it is understood that the solenoid valve 342 may be another type of valve. The solenoid valve 342 is in fluid communication with the fluid supply 354, the chamber of the actuator 346, and an exhaust conduit (not depicted). Further, the solenoid valve 342 is in electrical communication with the controller 344. When the solenoid valve 342 is in the normally open position, a portion of the chamber of the actuator 346 adjacent to the second piston is in fluid communication with the exhaust conduit through the solenoid valve 342, allowing the second piston to displace air to the exhaust conduit through the solenoid valve 342 and a conduit therebetween.

In response to a signal from the controller 344, the solenoid valve 342 may be placed in a closed position. In the closed position of the solenoid valve 342, a portion of the actuator 346 chamber adjacent to the second piston is placed in fluid communication with the fluid supply 354 through the solenoid valve 342. The portion of the actuator 346 chamber adjacent to the second piston is pressurized and displaces the second piston, causing the second piston to contact and displace the shift rail 347 partially within the actuator 346 chamber, and causing the engagement selector 316 to be moved away from the axle output gear 322. The effect of the second piston being displaced and moving the shift rail 347 within the actuator 346 chamber is that the engagement selector 316 becomes disengaged from the input gear 314 of the input shaft 312 because the ungeared portion of the engagement selector 316 is aligned with the input gear 314, as shown in FIG. 3C.

FIG. 3C is a sectional view of the engagement selector 316, the input gear 314, the axially extending portion 326 of the first side gear 318, and the axle output gear 322 illustrating the ungeared portion of the engagement selector 316 aligned with the input gear 314. As illustrated in FIG. 3C, the synchronizer 320 is not depicted and the assembly has been simplified to more clearly illustrate a relationship between the engagement selector 316, the input gear 314, the axially extending portion 326 of the first side gear 318, and the axle output gear 322.

The controller 344 is in communication with a power source (not depicted), such as an internal combustion engine associated with the tandem axle system 300, at least one sensor 356, and the solenoid valves 338, 340, 342. Preferably, the controller 344 is in electrical communication with the power source, the at least one sensor 356, and the solenoid valves 338, 340, 342. The controller 344 may be in communication with the power source, the at least one sensor 356, and the solenoid valves 338, 340, 342 using electrical conductors, pneumatics, hydraulics, a wireless communication medium, or another type of communication. The controller 344, in co-operation with the at least one sensor 356 and the solenoid valves 338, 340, 342 form a control system for the tandem axle system 300. The at least one sensor 356 may be configured to provide information to the controller 344 regarding a status of engagement of at least one of the actuators 346, 352, the mechanically operated actuation valve 336, the solenoid valves 338, 340, 342, or a condition of operation of a mechanical component of the tandem axle system 300. The tandem axle system 300 described hereinabove and illustrated in FIGS. 3A, 3B, and 3C is a three mode shiftable tandem axle system having a sequential shift pattern. The sequential shift pattern of the tandem axle system 300 is as follows: the 6×4 IAD lock mode of operation, the 6×4 unlocked mode of operation, a neutral position, and the 6×2 mode of operation.

Figure 4:
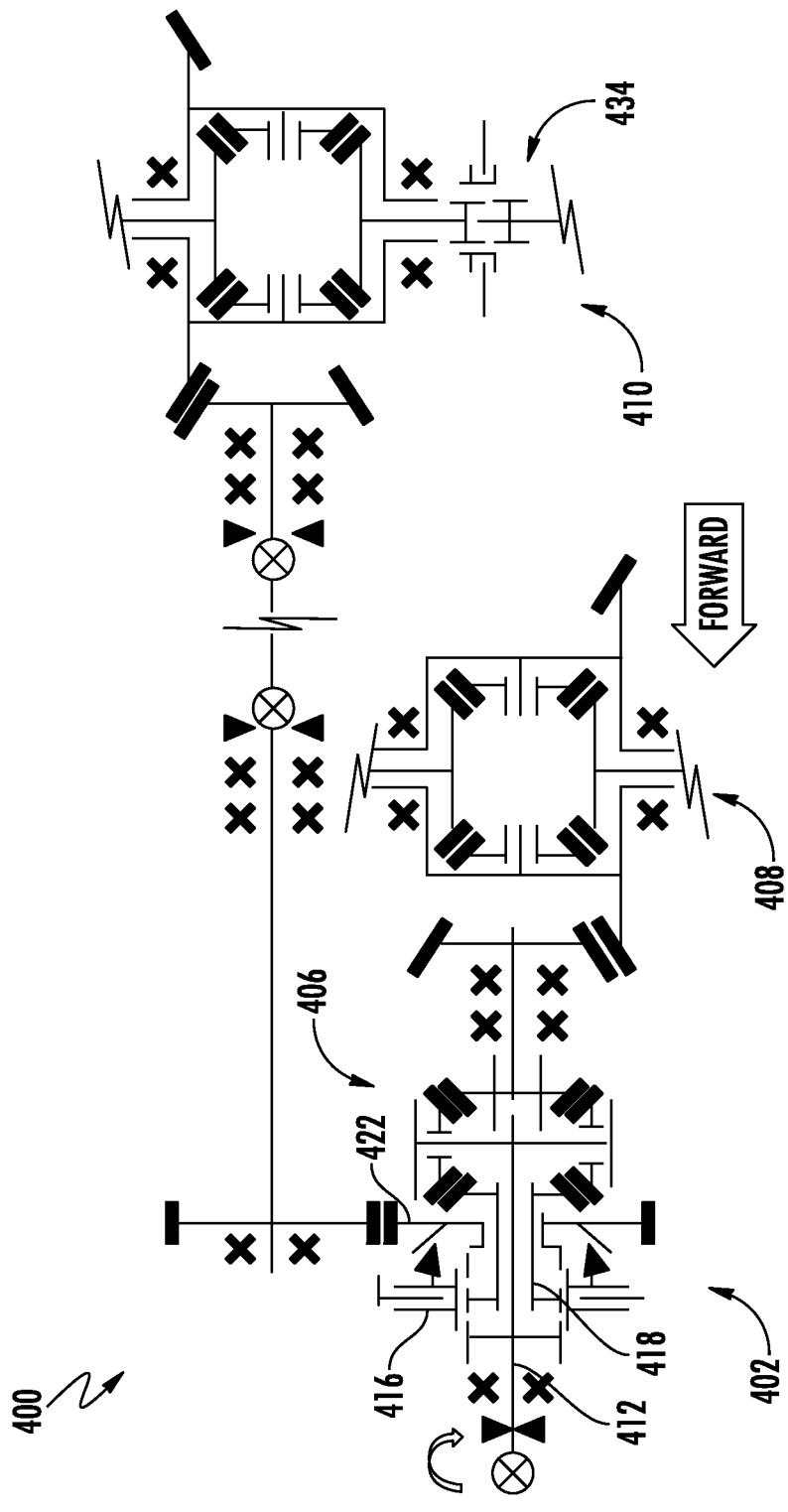
FIG. 4 illustrates a tandem axle system according to another embodiment of the presently disclosed subject matter.

FIG. 4 illustrates a tandem axle system 400 which is a variation of the tandem axle system 300, and has similar features thereto. It is also understood that the tandem axle system 400 shown in FIG. 4 may not illustrate all of the features of the tandem axle system 300. The variation of the present subject matter shown in FIG. 4 includes similar components to the tandem axle system 300 illustrated in FIGS. 3A, 3B, 3C, and 3D. Different and additional features of the variation shown in FIG. 4 can be appreciated by one skilled in the art in view of FIG. 4 and the tandem axle system 300 illustrated in FIGS. 3A, 3B, 3C and 3D.

As illustrated in FIG. 4 the tandem axle system 400 includes a mechanically operated shift assembly 402 (hereinafter referred to as a "shift assembly") according to an embodiment of the present subject matter. The tandem axle system 400 includes the shift assembly 402, an actuation assembly (not depicted) similar to the actuation assembly 304 shown in FIG. 3A, an inter-axle differential 406, a front axle assembly 408, and a rear axle assembly 410. The front axle assembly 408 and the rear axle assembly 410 are in selective driving engagement with the inter-axle differential 406 and the shift assembly 402. The actuation assembly is in driving engagement with a portion of the shift assembly 402 and the rear axle assembly 410. The front axle assembly 408 and the rear axle assembly 410 are well known in the art.

The actuation assembly comprises a primary shift rail assembly similar to the primary shift rail assembly 332, an axle disconnect assembly 434 for use with the rear axle assembly 410, a mechanically operated actuation valve (not depicted) similar to the mechanically operated actuation valve 336, a pair of primary solenoid valves (not depicted) similar to the primary solenoid valves 338, 340, a secondary solenoid valve (not depicted) similar to the secondary solenoid valve 342, and a controller (not depicted). The actuation assembly is in fluid communication with a filtered and pressure regulated fluid supply (not depicted). The actuation assembly is in driving engagement with an engagement selector 416 of the shift assembly 402 and a portion of the rear axle assembly 410. The engagement selector 416 has a geared inner surface that may be drivingly engaged with an input shaft 412, a first side gear 418, and an axle output gear 422 of the tandem axle system 400.

When the engagement selector 416 is placed into a position where it is drivingly engaged with the input shaft 412 and the first side gear 418 in response to control by the actuation assembly, the tandem axle system 400 is placed in placed in a 6×2 mode of operation. When the engagement selector 416 is placed into a position where it is drivingly engaged with the first side gear 418 and the axle output gear 422 in response to control by the actuation assembly, the tandem axle system 400 is placed in placed in an unlocked (i.e., open) 6×4 mode of operation. When the engagement selector 416 is placed into a position where it is drivingly engaged with the input shaft 412, the first side gear 418, and the axle output gear 422 in response to control by the actuation assembly, the tandem axle system 400 is placed in placed in a locked (i.e., closed) 6×4 mode of operation. It is understood that the control strategy described hereinabove with respect to the actuation assembly 304 may be adapted for use with the actuation assembly used with the tandem axle system 400 shown in FIG. 4. The tandem axle system 400 described hereinabove and illustrated in FIG. 4 is a three mode shiftable tandem axle system having a sequential shift pattern. The sequential shift pattern of the tandem axle system 400 illustrated in FIG. 4 is as follows: the 6×4 IAD lock mode of operation, the 6×4 unlocked mode of operation, a neutral position, and the 6×2 mode of operation.

Figure 5:
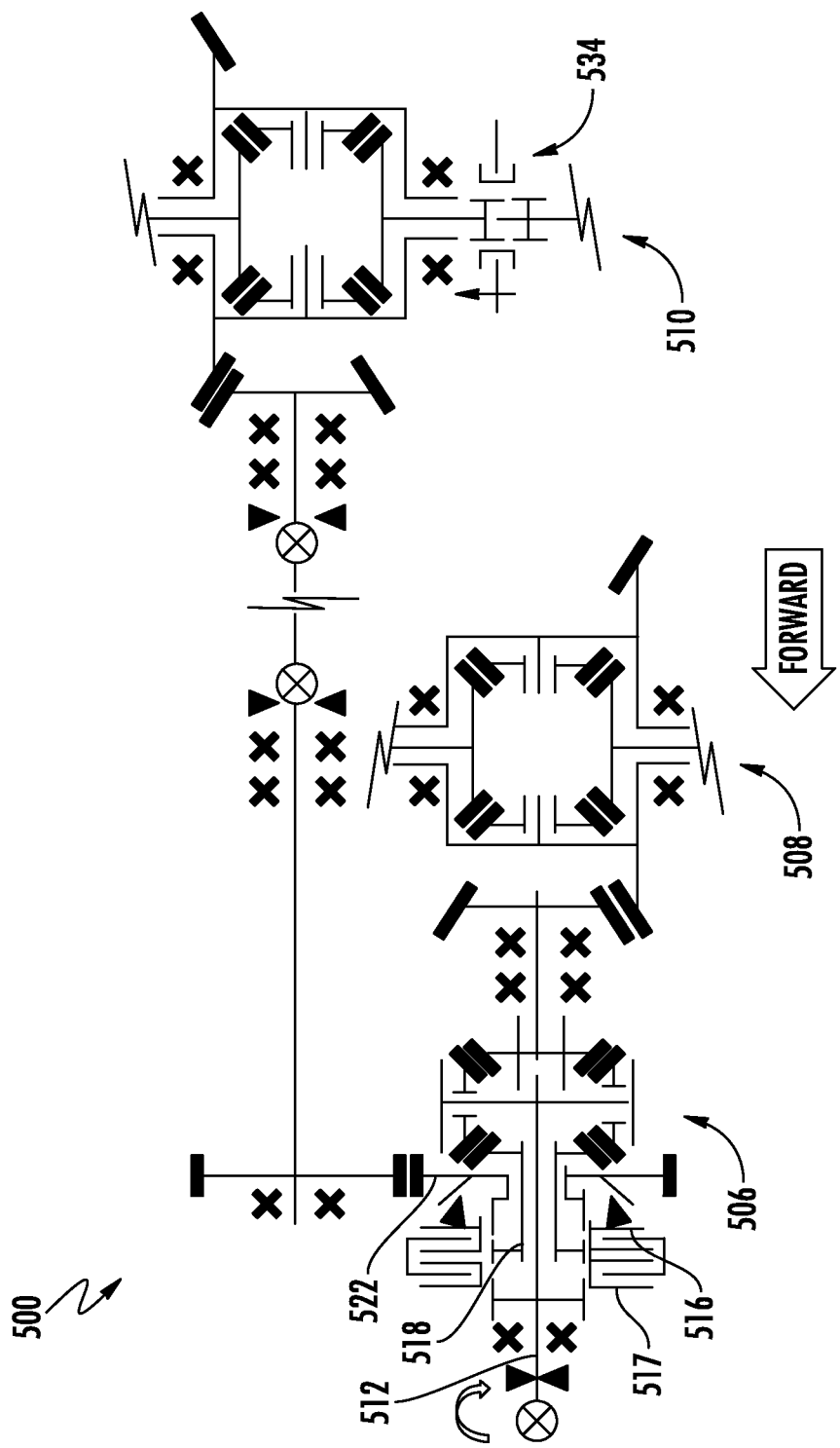
FIG. 5 is a schematic of a tandem axle system according to FIG. 2 depicting a rear axle.

As illustrated in FIG. 5, a tandem axle system 500 includes a mechanically operated shift assembly (not depicted) (hereinafter referred to as a "shift assembly") according to an embodiment of the present subject matter. The tandem axle system 500 as shown in FIG. 5 includes the shift assembly, an actuation assembly (not depicted) similar to the actuation assembly 204 shown in FIG. 2, an inter-axle differential 506, a front axle assembly 508, and a rear axle assembly 510. The front axle assembly 508 and the rear axle assembly 510 are in selective driving engagement with the inter-axle differential 506 and the shift assembly. The actuation assembly is in driving engagement with a portion of the shift assembly and the rear axle assembly 510. The front axle assembly 508 and the rear axle assembly 510 are well known in the art.

The actuation assembly comprises a primary shift rail assembly similar to the shift rail assembly 232, an axle disconnect assembly 534 for use with the rear axle assembly 510, a mechanically operated actuation valve (not depicted) similar to the mechanically operated actuation valve 236, a pair of primary solenoid valves (not depicted) similar to the primary solenoid valves 238, 240, a secondary solenoid valve (not depicted) similar to the secondary solenoid valve 242, and a controller (not depicted). The actuation assembly is in fluid communication with a filtered and pressure regulated fluid supply (not depicted). The actuation assembly is in driving engagement with two engagement selectors 516, 517 of the shift assembly and a portion of the rear axle assembly 510. The first engagement selector 516 has a geared inner surface that may be drivingly engaged with an axle output gear 522 and a first side gear 518 of the tandem axle system 500. The second engagement selector 517 has a geared inner surface that may be drivingly engaged with an input shaft 512 and the first side gear 518 of the tandem axle system. It is understood that the control strategy described hereinabove with respect to the actuation assembly 204 may be adapted for use with the actuation assembly used with the tandem axle system 500 shown in FIG. 5. The tandem axle system 500 described hereinabove and illustrated in FIG. 5 is a three mode shiftable tandem axle system having a sequential shift pattern. The sequential shift pattern of the tandem axle system illustrated in FIG. 5 is as follows: the 6×4 IAD lock mode of operation, the 6×4 unlocked mode of operation, a neutral position, and the 6×2 mode of operation.

While various embodiments have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. A tandem drive axle mechanical shift assembly, comprising:
   a first shift rail assembly comprising:
     a first pneumatic actuator;
     a first shift rail having a first diameter and a second diameter defining a cam surface, wherein said first shift rail is actuated via said first pneumatic actuator;
     a first shift fork having a first end coupled with said first shift rail and a second end coupled with an engagement selector;
   a second shift rail assembly comprising:
     a second pneumatic actuator;
     a second shift rail actuated via said second pneumatic actuator;

a second shift fork having a first end coupled with said second shift rail and a second end coupled with an inter-axle differential lock-up clutch;

a first primary valve in fluid communication with a fluid reservoir;

a second primary valve in fluid communication with said fluid reservoir;

a secondary valve in fluid communication with said fluid reservoir and selective fluid communication with said second pneumatic actuator; and a first actuation valve operated by said first shift rail cam surface, wherein said first actuation valve is in selective fluid communication said first and second primary valves, said first pneumatic actuator, and said second pneumatic actuator.

2. The tandem drive axle mechanical shift assembly of claim 1, further comprising:

an axle disconnect assembly comprising:
- a third pneumatic actuator;
- a third shift rail actuated via said third pneumatic actuator;
- a third shift fork having a first end coupled with said third shift rail and a second end coupled with an axle clutch;

said second shift rail having a first diameter and a second diameter defining a cam surface; and a second actuation valve operated by said second shift rail cam surface, wherein said second actuation valve is in fluid communication with said first actuation valve and said third pneumatic actuator.

3. The tandem drive axle mechanical shift assembly of claim 1, further comprising:

a shift rail toggle having a first end disposed adjacent to said first shift rail, a second end disposed adjacent to said second shift rail, and a pivot mount portion; and wherein said shift rail toggle first end is driven by said first shift rail, and said shift rail toggle second end drives said second shift rail.

4. The tandem drive axle mechanical shift assembly of claim 1, further comprising:

a first drive axle assembly;

a second drive axle assembly;

an input shaft drivingly engaged with said inter-axle differential;

a first inter-axle differential side gear rotatably disposed about said input shaft, wherein said first side gear includes teeth for selective engagement with said inter-axle differential lock-up clutch;

an axle output gear rotatably disposed about said first side gear;

a synchronizer disposed about and drivingly engaged with said first side gear, wherein said synchronizer is driven by said engagement selector and includes a surface for selective engagement with said axle output gear;

a transfer gear in meshed engagement with said axle output gear and disposed about a pinion gear shaft; and a front drive axle assembly ring gear in driving engagement with said pinion gear shaft.

5. The tandem drive axle mechanical shift assembly of claim 4, wherein at a first position:

said second primary valve is in fluid communication with said first actuation valve;

said first actuation valve is in fluid communication with said first pneumatic actuator;

said first shift rail drives a shift rail toggle having a first end disposed adjacent to said first shift rail, a second end disposed adjacent to said second shift rail, and a pivot mount portion about said pivot mount portion; and said shift rail toggle second end drives said second shift rail; and said inter-axle differential lock-up clutch is drivingly engaged with said first side gear.

6. The tandem drive axle mechanical shift assembly of claim 4, wherein at a second position:

said first primary valve is in fluid communication with said first actuation valve and said first pneumatic actuator;

said first actuation valve is in fluid communication with said second and third pneumatic actuators;

said inter-axle differential lock-up clutch is disengaged from said first side gear; and said axle output gear is drivingly engaged with said first side gear via said synchronizer.

7. The tandem drive axle mechanical shift assembly of claim 4, wherein at a third position:

said first primary valve is in fluid communication with said first actuation valve and said first pneumatic actuator;

said first actuation valve is in fluid communication with said third pneumatic actuator;

said secondary valve is in fluid communication with said second pneumatic actuator;

said inter-axle differential lock-up clutch is drivingly engaged with said first side gear; and said axle output gear is drivingly engaged with said first side gear via said synchronizer.

* * * * *